UNITED STATES PATENT OFFICE 2,550,023

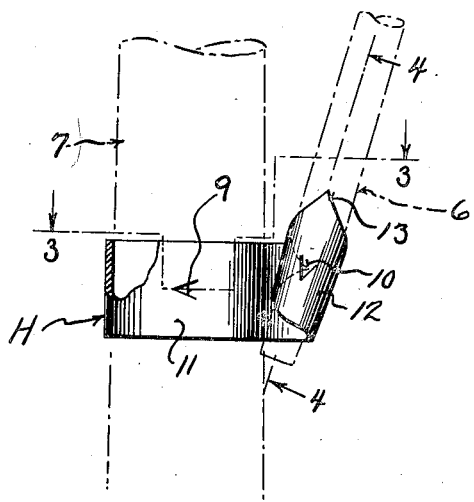
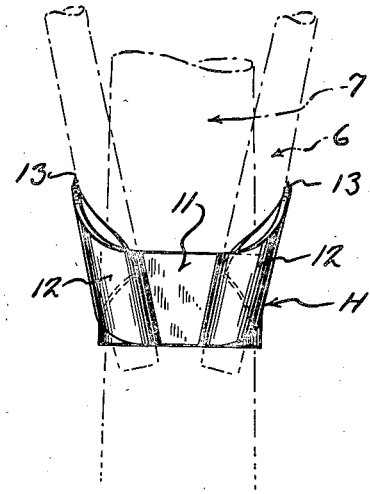
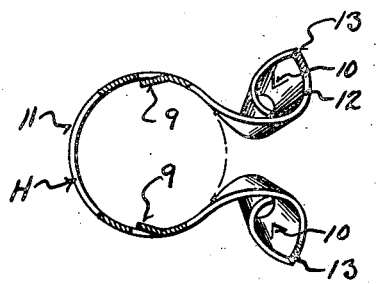
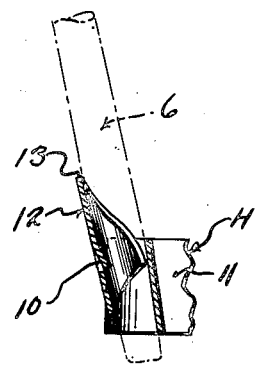
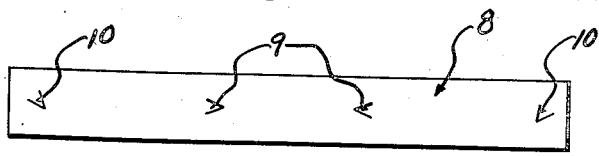
INVENTOR
WILLIAM P. REILLY
BY
ATTORNEYS

CHRISTMAS TREE BRANCH HOLDER

William P. Reilly, Menomonee Falls, Wis.

Application July 19, 1947, Serial No. 762,099

2 Claims. (Cl. 248—42)

This invention appertains to holders and brackets and more particularly to a novel appliance for securing branches to the trunks of trees (such as Christmas trees) for decorative purposes.

One of the primary objects of my invention is to provide a branch holder for trees which can be quickly and easily attached to a tree trunk without the aid of tools, for replacing broken branches or for attaching branches to bare parts of the tree.

Another salient object of my invention is to provide a tree branch holder which will be durable and efficient in use, one that will be simple and easy to manufacture and one which can be placed upon the market at an extremely low cost.

A further important object of my invention is to provide a Christmas tree branch holder which can be economically formed from a single piece of sheet metal and which when formed includes a resilient cuff having one or more sockets on its terminals for receiving and supporting branches at a desired angle.

A still further object of my invention is to provide a Christmas tree branch holder which can be readily sprung around a tree trunk at the desired point and which has formed on its terminals coiled sleeves for receiving the branches to be supported.

With these and other objects in view the invention consists in the novel construction, arrangement and formation of parts as will be hereinafter more specifically described, claimed and illustrated in the accompanying drawing, in which drawing Figure 1 is a side elevational view of my novel tree branch holder, parts of the holder being shown broken away and in section.

Figure 2 is a front elevational view of the branch holder.

Figure 3 is a fragmentary horizontal sectional view taken on the line 3—3 of Figure 1 looking in the direction of the arrows.

Figure 4 is a detail sectional view through one of the sleeves or sockets, the section being taken on the line 4—4 of Figure 1 looking in the direction of the arrows.

Figure 5 is a plan view of the sheet metal strap from which the holder can be formed.

Referring to the drawings in detail, wherein similar reference characters designate corresponding parts throughout the several views the letter H generally indicates my novel tree branch holder. The holder is adapted to secure branches 6 to a tree trunk 7 as can be readily understood.

My holder H can be formed from a single strip of sheet metal 8, shown in Figure 5 of the drawings and the metal is preferably cut in its flat form to provide a pair of inner prongs 9 and a pair of outer prongs 10. The strip of metal is fabricated to provide a substantially cylindrical cuff 11 open at one side and the terminals of the cuff are rolled to provide inclined sockets or sleeves 12. By referring to Figures 1 to 4 inclusive, it can be seen that during the rolling of these sockets that the corners of the metal strip will be disposed uppermost to provide points 13, which effectively function to engage the sides of branches to effectively support the same.

The prongs 9 are stamped inwardly and are adapted to dig in a tree trunk. The prongs 10 are also stamped inwardly and are adapted to dig in branches 6 placed in the sleeves or sockets 12.

The holder is preferably formed from metal possessing some resiliency and in the use of my holder the sleeves or sockets 12 are grasped by the user and the cuff is sprung open against the inherent resiliency of the metal and the cuff is then placed around the tree trunk 7 at the bare spot of the tree. Upon release of the sockets or sleeves 12 the cuff will resume its normal position and embrace the tree trunk. The prongs 9 tend to dig into the tree trunk and hold the cuff in the desired position. The branches can now be placed in the sockets 12 and the sockets function to hold the branches at the desired angle. If desired, only one socket can be used and where necessary both sockets can be used.

From the foregoing description, it can be seen that I have provided an exceptionally simple tree branch holder which will effectively accomplish its purpose and which can be associated with a tree without the use of tools.

Changes in details may be made without departing from the spirit or the scope of my invention, but what I claim as new is:

1. A device particularly adapted for holding branches on tree trunks comprising a resilient tree trunk engaging cuff open at one side, tree branch receiving sockets formed on the terminals of the cuff arranged at an angle to the longitudinal axis of the cuff, said sockets also forming finger pieces for facilitating the spreading of the cuff to permit the same to be sprung around a tree trunk and a flaring tree trunk entrance throat.

2. A device particularly adapted for associating branches with a tree trunk comprising a resilient cylindrical tree trunk engaging cuff open at one side, tree branch receiving sockets on the terminals of the cuff arranged at an angle to the longitudinal axis of the cuff forming a flaring entrance throat, struck in tree trunk engaging prongs formed on the cuff, and struck out branch engaging prongs formed on the sockets.

WILLIAM P. REILLY.

REFERENCES CITED

The following references are of record in the file of this patent:

UNITED STATES PATENTS

| Number | Name | Date |
|---|---|---|
| 1,317,590 | Obolewicz | Sept. 30, 1919 |
| 1,571,581 | Fliegelman | Feb. 2, 1926 |
| 1,895,609 | Davis | Jan. 31, 1933 |
| 2,275,282 | Bigham | Mar. 3, 1942 |